(12) United States Patent
Perez-Hinojosa

(10) Patent No.: US 8,242,200 B2
(45) Date of Patent: Aug. 14, 2012

(54) PROCESS FOR PREPARING A THERMAL INSULATION COATING PAINT WITH FLEXIBILITY AND LIGHTNESS PROPERTIES

(76) Inventor: Ulises Eladio Perez-Hinojosa, Nuevo Leon (MX)

( * ) Notice: Subject to any disclaimer, the term of this patent is extended or adjusted under 35 U.S.C. 154(b) by 38 days.

(21) Appl. No.: 12/656,730

(22) Filed: Feb. 16, 2010

(65) Prior Publication Data

US 2010/0152366 A1 Jun. 17, 2010

Related U.S. Application Data

(63) Continuation-in-part of application No. 11/822,339, filed on Jul. 5, 2007, now abandoned.

(30) Foreign Application Priority Data

May 22, 2007 (MX) .................. MX/a/2007/006148

(51) Int. Cl.
| | |
|---|---|
| C08L 33/00 | (2006.01) |
| C08L 51/00 | (2006.01) |
| C09B 67/00 | (2006.01) |
| C08K 5/00 | (2006.01) |
| C08K 5/05 | (2006.01) |
| C08K 3/22 | (2006.01) |
| C08F 220/06 | (2006.01) |

(52) U.S. Cl. ........ 524/522; 524/386; 524/379; 524/436; 524/502; 524/515; 524/539

(58) Field of Classification Search .................. 524/539, 524/502, 515, 522, 386, 379, 436
See application file for complete search history.

(56) References Cited

U.S. PATENT DOCUMENTS

| | | | | | |
|---|---|---|---|---|---|
| 2,760,886 | A | * | 8/1956 | Prentiss et al. | 428/461 |
| 3,901,987 | A | * | 8/1975 | Payne et al. | 428/219 |
| 3,942,995 | A | * | 3/1976 | Ichikawa et al. | 106/145.1 |
| 4,278,575 | A | * | 7/1981 | Nakamura et al. | 525/7 |
| 4,423,118 | A | * | 12/1983 | Corbett et al. | 428/514 |
| 2006/0292305 | A1 | * | 12/2006 | Skuse et al. | 427/361 |

FOREIGN PATENT DOCUMENTS

WO   WO 2005052066 A2 *   6/2005

* cited by examiner

*Primary Examiner* — Karuna P Reddy
(74) *Attorney, Agent, or Firm* — Breiner & Breiner, LLC

(57) ABSTRACT

A process is described in which, through the combination of certain components, a thermal insulated coating paint is obtained having the properties of flexibility and lightness (low density) in a film of low thickness. This coating paint offers better thermal insulation properties with a low thickness film than other insulators having greater thickness, without requiring any additional protection. These properties are provided due to the internal structure of the coating paint wherein internal caverns are formed by the reaction of ramified chain polymers and additional materials. These characteristics are not present in traditional coating paints.

4 Claims, No Drawings

PROCESS FOR PREPARING A THERMAL INSULATION COATING PAINT WITH FLEXIBILITY AND LIGHTNESS PROPERTIES

RELATED APPLICATIONS

This application is a continuation-in-part of U.S. Ser. No. 11/822,339, filed Jul. 5, 2007, now abandoned entitled PROCEDURE FOR THE PREPARATION OF A THERMAL, FLEXIBLE AND LIGHT COATING PAINT.

FIELD OF INVENTION

The invention is directed to a process in which, by the combination of certain components, a thermal insulated coating paint is obtained with flexibility and lightness (low density) properties in the form of a low thickness film. This coating paint offers better thermal insulation properties with a low thickness film than other insulators having a higher thickness. These properties are due to the internal structure of the coating paint wherein internal caverns are formed during the reaction of materials providing the coating paint. These characteristics are not present in traditional coating paints.

BACKGROUND OF THE INVENTION

Thermal insulators from the beginning have been used or manufactured based on the idea or concept of using the volume and/or thickness of the product to provide thermal insulation properties. However, in order for this type of insulator to last, it has to be protected from solar rays and water, as well as avoid damage that results from the direct exposure to the environment.

SUMMARY OF INVENTION

The present invention has as an objective a process in which, through the combination of certain components, a thermal insulation coating paint is obtained with properties such as a low thickness film, flexibility, lightness (low density) and better efficiency in thermal insulation, as well as having no need for protection from solar rays, water, and the environment, unlike other common insulation materials that insulate based on having a higher volume, thickness and need for additional protection against solar rays, water, and the environment. These properties of the invention are achieved due to the formation of flexible and plastic caverns in the internal structure of the coating paint, which are formed by the reaction of a ramified chain polymer, as well as the addition of controlled solutions. These features in conventional systems are impossible to achieve.

A process of the invention is the preparation of a thermal insulation coating paint having flexibility and lightness properties which is characterized by the controlled formation (through reaction) of caverns through the addition of materials, mixing of ramified chain polymers and modified acrylics, as well as the addition of organic and inorganic pigments, to form the flexible caverns. All these elements properly balanced give the coating paint thermal, flexibility and lightness properties with a high level of adhesion and autoprotection against water, solar rays and environmental elements upon exposure thereto.

The process for preparing the thermal insulation coating paint is also characterized by the generation or formation of the internal caverns of the coating paint. The internal caverns contain a moisture percentage that is needed for the formation of the coating paint having the properties of thermal insulation, flexibility and lightness, in order to form a monolithic film with a low thickness and volume.

DETAILED DESCRIPTION OF THE PRESENT INVENTION

This invention refers to a process of manufacturing a coating paint with properties such as thermal insulation, lightness and flexibility. The product characteristics are obtained by mixing a ramified chain polymer with other substances and compounds, under controlled conditions, such as temperature (ranges from 77° F. to 86° F.), mixing in a proportion of 50:5 of polymer to other materials, and with a 35% controlled humidity (deionized water).

In a portion of a ramified chain polymer, different controlled substances are added until ellipsoidal internal caverns are formed. This is done under a controlled pH, immediately after the thixotropy of the modified acrylic is controlled (stable), the polymer content is increased until a slightly endothermic reaction occurs. At this point, a slow temperature decrease is provided by the reaction of pH agent and the polymers mixed (with ammonium hydroxide acting as a catalyst while the pH is controlled and has as an effect a temperature decrease in the mixture). The whole process is developed at a pH range of from 7.5 to 9.2.

More specifically, in a reactor equipped with a stirrer, a thermometer and a pH meter—

Add 9,743 parts of deionized water,

Add 0.024 parts of isothiazolone,

Mix the solution and add 0.185 parts of polyelectrolyte salt of carboxylate and keep mixing constantly while making these additions, Add 0.305 parts of 2-ethyl-hexane, and then add at constant temperature (room temperature) 0.087 parts of monoethylene glycol, Add 0.124 parts of sodium hexametaphosphate (solution at 20%), Add 38.70 parts of styrene acrylic copolymer, Add 13.09 parts of titanium dioxide, Add 0.087 parts of monoethylene glycol, Add and keep mixing constantly, 13.09 parts of laminated calcium bicarbonate, Add 12.300 parts of hydroxyl-methyl-cellulose, Add to the mixture 0.779 parts of chlorinated paraffin, Add 0.109 parts of texanol, Add to the mixture a buffer of 0.498 parts of ammonium hydroxide (at 28%), Add 0.862 parts of an associative acrylate compound, Allow the solution to settle for 5 minutes, and Restart the mixing process and add 10 parts of acrylonitrile-co-vinyl polymer at 95%, where this compound is physically represented by micro-spherical particles which are added to the mixture forming the internal caverns (these caverns being interruptions of conductivity).

The following is noted as to the above process— pH conditions during the entire process should be controlled within a range of 7.5-9.2; and Viscosity during the entire process should be within a range of 30,000-50,000 centipoises.

The process described can be better understood through the following examples which illustrate the advantages of the invention. However, such are not intended to limit the application or use of the invention as a thermal insulator.

EXAMPLE 1

With a low (volume) thickness, better thermal properties are obtained, compared to other insulators that required a higher volume or thickness.

EXAMPLE 2

Once dry, the thermal insulation coating paint does not require any additional protection against solar rays, water or the environment, unlike certain conventionally known insulators which require an acrylic covering or steel/aluminum sheets to protect them against solar rays, water, and the environment.

To support the above given information field data is reported as set forth below.

1. Thermal conductivity tests were conducted with the thermal insulation coating paint with flexibility and lightness properties of the invention. These tests included comparison with other thermal insulators of the same thickness and volume. The results of the thermal insulation coating with flexibility and lightness properties were better in terms of lower conductivity than other thermal insulators.

2. Thermal conductivity evaluation to determine the R factor (thermal resistance factor) and K factor (thermal conductivity factor) were effected at the CENTRO DE INVESTIGACION DE QUIMICA APLICADA of the CONACYT according to the NOM C189 or ASTM C518 standards.

3. Accelerated weatherings by QUV were conducted with favorable results.

4. Tests to evaluate adhesion to different surfaces like concrete, metal sheets, wood, etc. were made with favorable results.

This field data is not intended to limit the reach and benefits of the invention. Any variation with the same supported and described results are encompassed by the invention.

It is claimed:

1. A process for preparing a thermal, flexible and low density coating paint comprising steps:
  (a) adding 9,743 parts of deionized water to a container;
  (b) adding 0.024 parts of isothiazolone to the container to form a solution;
  (c) mixing the solution of (b) and adding 0.185 parts of polyelectrolyte salt of carboxylate, said mixing being maintained while making additions;
  (d) adding 0.305 parts of 2-ethyl-hexane, and then adding 0.087 parts of a first portion of monoethylene glycol at room temperature;
  (e) adding 0.124 parts of sodium hexametaphosphate in solution at 20%;
  (f) adding 38.70 parts of styrene acrylic copolymer;
  (g) adding 13.09 parts of titanium dioxide;
  (h) adding 0.087 parts of a second portion of monoethylene glycol;
  (i) adding 13.09 parts of laminated calcium bicarbonate while maintaining constant mixing;
  (j) adding 12.30 parts of hydroxyl-methyl-cellulose;
  (k) adding 0.779 parts of chlorinated paraffin;
  (l) adding 0.109 parts of texanol;
  (m) adding 0.498 parts of a buffer of ammonium hydroxide at 28%;
  (n) adding 0.862 parts of an associative acrylate compound;
  (o) allowing the solution formed following (n) to settle for 5 minutes; and
  (p) restarting mixing and adding 10 parts of acrylonitrile-co-vinyl polymer at 95%, where said polymer is physically present as micro-spherical particles,
  wherein viscosity during the process is within a range of 30,000-50,000 centipoises.

2. The process according to claim 1, wherein the steps of adding and mixing are carried out at a controlled pH of between 7.5 to 9.2.

3. The process according to claim 1, wherein the steps of adding and mixing are carried out at a temperature of between 77° F. to 86° F. with a 35% controlled humidity.

4. A composition of a thermal, flexible and low density coating paint obtained by the process of claim 1, which is made by a mixture of:
  (a) 9,743 parts of said deionized water,
  (b) 0.024 parts of said isothiazolone,
  (c) 0.185 parts of said polyelectrolyte salt of carboxylate,
  (d) 0.305 parts of said 2-ethyl-hexane,
  (e) 0.087 parts of said first portion of monoethylene glycol,
  (f) 0.124 parts of said sodium hexametaphosphate in solution at 20%,
  (g) 38.70 parts of said styrene acrylic copolymer,
  (h) 13.09 parts of said titanium dioxide,
  (i) 0.087 parts of said second portion of monoethylene glycol,
  (j) 13.09 parts of said laminated calcium bicarbonate,
  (k) 12.300 parts of said hydroxyl-methyl-cellulose,
  (l) 0.779 parts of said chlorinated paraffin,
  (m) 0.109 parts of said texanol,
  (n) 0.498 parts of said ammonium hydroxide at 28%,
  (o) 0.862 parts of said associative acrylate compound, and
  (p) 10 parts of said acrylonitrile-co-vinyl polymer at 95%.

* * * * *